United States Patent
Anderson

(10) Patent No.: US 7,590,389 B2
(45) Date of Patent: Sep. 15, 2009

(54) RADIO LINK QUALITY DETERMINATION IN A WIRELESS NETWORK

(75) Inventor: Nicholas William Anderson, Bristol (GB)

(73) Assignee: IPWireless, Inc., San Bruno, CA (US)

( * ) Notice: Subject to any disclaimer, the term of this patent is extended or adjusted under 35 U.S.C. 154(b) by 454 days.

(21) Appl. No.: 11/058,570

(22) Filed: Feb. 14, 2005

(65) Prior Publication Data

US 2006/0183429 A1    Aug. 17, 2006

(51) Int. Cl.
*H04B 17/00* (2006.01)

(52) U.S. Cl. .......... 455/67.7; 455/67.11; 455/522; 455/63.1; 455/226.1; 370/252

(58) Field of Classification Search ........... 455/67.13, 455/450, 513, 63.1, 162.2, 515, 522, 67.11, 455/67.15, 67.16, 67.7, 68–69, 500–502, 455/226.1–226.4; 370/320, 331, 342, 335, 370/252, 311, 318
See application file for complete search history.

(56) References Cited

U.S. PATENT DOCUMENTS

| | | | | |
|---|---|---|---|---|
| 5,539,728 A | * | 7/1996 | Gaiani et al. | 370/342 |
| 5,697,056 A | * | 12/1997 | Tayloe | 455/513 |
| 5,898,730 A | * | 4/1999 | Hensley et al. | 375/224 |
| 5,978,657 A | * | 11/1999 | Suzuki | 455/522 |
| 6,188,682 B1 | * | 2/2001 | Takagi et al. | 370/342 |
| 6,996,069 B2 | * | 2/2006 | Willenegger | 370/252 |
| 7,031,742 B2 | * | 4/2006 | Chen et al. | 455/522 |
| 2003/0003875 A1 | * | 1/2003 | Oestreich | 455/69 |
| 2004/0077368 A1 | | 4/2004 | Anderson | |
| 2004/0077370 A1 | | 4/2004 | Dick et al. | |
| 2004/0203991 A1 | * | 10/2004 | Chen et al. | 455/522 |

OTHER PUBLICATIONS

International Search Report mailed on May 8, 2006, for PCT Application No. PCT/EP2006/050863, filed Feb. 10, 2006, three pages.
Written Opinion of the International Searching Authority for PCT Application No. PCT/EP2006/050863, filed Feb. 10, 2006, six pages.

* cited by examiner

*Primary Examiner*—Tuan A Tran
(74) *Attorney, Agent, or Firm*—Morrison & Foerster LLP

(57) ABSTRACT

A method of determining a radio link quality state in a wireless communication system by predicting a signal quality metric of a secondary channel in the absence of the second signal. The predicted signal quality metric may be determined from a received reference signal on a first channel and a measured interference level of the second channel.

19 Claims, 5 Drawing Sheets

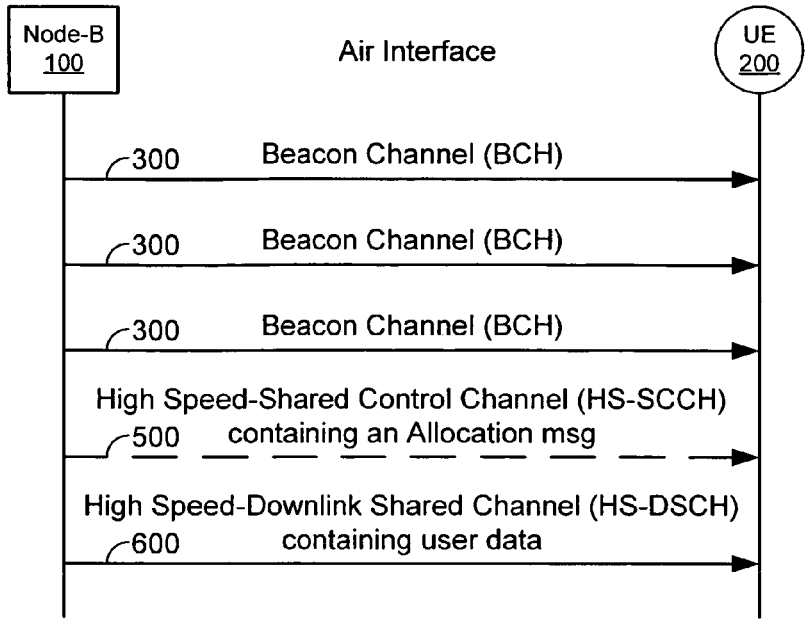
FIGURE 5
| Chan | BCH | \ | \ | \ | BCH | HS-SCCH | \ | HS-DSCH | BCH | HS-SCCH | HS-DSCH | HS-DSCH |
|---|---|---|---|---|---|---|---|---|---|---|---|---|
| TS | 0 | 1 | 2 | 3 | 0 | 1 | 2 | 3 | 0 | 1 | 2 | 3 |
| | Frame n | | | | Frame n+1 | | | | Frame n+2 | | | |
FIGURE 6 (TDD)
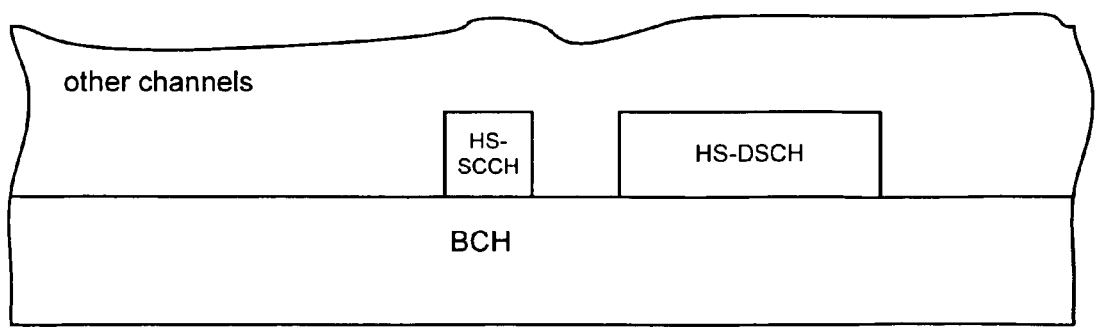
FIGURE 7 (FDD Downlink)

RADIO LINK QUALITY DETERMINATION IN A WIRELESS NETWORK

BACKGROUND OF THE INVENTION

1. Field of the Invention

The present invention relates generally to wireless communications and more particularly to determination of a radio link quality state.

2. Description of the Related Art

In a wireless network, an asymmetric volume of data is typically exchanged between a base station and a mobile terminal. A mobile terminal usually transmits a fraction of the data on an uplink channel as compared to the data a base station transmits to the mobile on a downlink channel. To more efficiently use limited radio resources, a network may allocate uplink and downlink channels to match this expected asymmetric demand.

Additionally, a demand for downlink channel capacity may be intermittent. For example, a user surfing the Internet may transmit a few commands on the uplink to access a web page. Once the web page is available, the network transmits the web page data to the user on the downlink. Until the user selects the next link or goes to another web page, no user data is transferred.

Wireless systems often use one of two methods for transferring user data. Some wireless systems establish a link between a base station and a mobile station only after user data is received by the network and is waiting to be transferred to the user. Each time a new block of user data arrives, the system establishes a new connection between the base station and the mobile terminal then transfers the data. Once the data transfer is complete, in order to release the radio resource, the connection may be suspended and the channel becomes free for another data transfer. This scheme has the advantage that a data channel is not established when the channel would otherwise be idle. This efficient use of radio resources comes at the cost of increase data transfer latency. That is, an additional latency is added to each data transfer due to the time necessary to establish the link.

Alternatively, a wireless system may establish a dedicated channel between a base station and a mobile station. In such systems, a link is established prior to the arrival of user data and the latency of establishing a connection may be ignored from the time needed to transfer the user data. Typically, a dedicated channel remains idle until new data arrives for transfer to a mobile terminal. If a dedicated channel is established before user data arrives, a mobile terminal may monitor the dedicated channel to determine link quality prior to user data transfer. Unfortunately, such systems occupy at least one channel for each mobile terminal even though no data may be being transferred.

An example of a wireless network system specifying an established link prior to the availability of data for transfer is a High Speed Downlink Packet Access (HSDPA) network as defined by the Third Generation Partnership Project (3GPP). A 3GPP HSDPA system provides support for enhanced packet data services, which may heavily utilize a high-speed downlink shared channel (HS-DSCH). The 3GPP HSDPA recommendations specify an established associated dedicated physical channel (DPCH) in both uplink and downlink directions. Typically, a dedicated transport channel (DCH) is allocated a CDMA code and is mapped to a DPCH. Within a typical HSDPA system, the DCH is used to carry low-rate signalling and other background higher-layer data to the user—thereby higher rate data transfers make considerable use of the high-speed downlink shared channel (HS-DSCH).

When no user data or signaling information is available for transfer on the DCH, the DCH is largely unused, however, continues to occupy CDMA code resources on the downlink. A mobile terminal in an HSDPA system may monitor a downlink DCH to determine overall signal quality. The mobile terminal may then use the signal quality measurement to determine whether or not the mobile terminal is in data communication with the network. When downlink reception is determined to be unacceptably poor, the mobile terminal may attempt a re-establishment of the radio link, and may also release the radio resources used for uplink and cease their transmission.

Unfortunately, each dedicated channel occupies a resource, even when idle. In a CDMA system, each dedicated channel may be mapped to a unique CDMA code or set of codes allocated to that channel. In a CDMA system with a TDMA component, the code resource(s) may also apply for a predetermined period of time, or a timeslot. Since the available CDMA codes (and time slots, if applicable) are a finite resource in a CDMA system, each of these reserved but effectively unused codes in the aggregate derogates system performance and capacity. In such situations with a large number of established but idle links, a system may become code-limited.

It is therefore desirable to implement a wireless network for transferring intermittent user data that more efficiently uses code resources and improves system capacity. A method by which this may be achieved is by sending the higher-layer data and signaling to the user on the (intermittent) downlink shared channel, thereby alleviating the need for the downlink dedicated channel. However, means for determining downlink link quality and establishing a radio link quality state must continue to be provided in the absence of the downlink dedicated channel.

BRIEF SUMMARY OF THE INVENTION

A method is provided for determining a radio link quality state in a wireless communication system by predicting a signal quality metric of a secondary channel without receiving the secondary signal. The predicted signal quality metric may be determined from processing a received reference signal and a measured interference level.

Some embodiments provide a method of determining a radio link quality state in a wireless communication system, the method comprising: measuring a received signal strength of a first channel; determining a received interference level of a second channel; predicting a quality metric of the second channel using a plurality of parameters, including: the received signal strength of the first channel; and the received interference level of the second channel; and identifying the radio link quality state based on the predicted quality metric.

Furthermore, some embodiments include one or more of the following.

In some embodiments, the predicted quality metric is either a signal-to-noise ratio (SNR) or a signal-to-noise-plus-interference ratio (SNIR) of the second channel.

In some embodiments, the plurality of parameters further includes a difference value D. In some embodiments, the predicting a quality metric of the second channel may include combining: the received signal strength of the first channel; a negative of the received interference level of the second channel; and the difference value D.

In some embodiments, the value D identifies a minimum attenuation in transmit power level of a second signal transmitted on the second channel relative to a transmit power level of a first signal transmitted on the first channel. Alternatively, in some embodiments, the value D is an attenuation in transmit power level of a second signal transmitted on the second channel relative to a transmit power level of a first signal transmitted on the first channel.

In some embodiments, the plurality of parameters further includes: a transmit power level of a first signal transmitted on the first channel; and a transmit power level of a second signal transmitted on the second channel. In some embodiments, at least one of the plurality of parameters is wirelessly signaled from a network to a mobile terminal. In some embodiments, at least one of the plurality of parameters is wirelessly broadcast from a network to a plurality of mobile terminals. In some embodiments, at least one of the plurality of parameters is a constant value.

In some embodiments, the identifying the radio link quality state includes computing a statistic from multiple determinations of the predicted quality metric. In some embodiments, the identifying the radio link quality state further includes: comparing the statistic to a threshold value; and setting the radio link quality state based on the comparison.

In some embodiments, the first channel is a channel having a constant transmit power level over a period. In some embodiments, the first channel is transmitted within a first time slot period and the second channel is transmitted within a second time slot period different than the first time slot period. In some embodiments, the first channel is transmitted with a first code and the second channel is transmitted with a second code different than the first code. In some embodiments, the first channel includes a beacon channel. In some embodiments, the second channel includes a control channel. In some embodiments, the second channel communicates channel allocation messages.

In some embodiments, at least one of the plurality of parameters is formed from a series of values. For example, a parameter is formed from by an averaging process of the series of values, such as by low pass filtering or performing an arithmetic average on the measurements.

Some embodiments provide a method of determining a radio link quality state on a secondary channel in a wireless communication system between a network and a mobile terminal, wherein the secondary channel is used intermittently as a control channel, the method comprising: comparing a threshold value to a plurality of calculated values, wherein each of the plurality of calculated values is sequentially formed by: measuring a reference level ($S_{reference}$) received on a reference channel; measuring, within a period, a level ($I_{secondary}$) received on the secondary channel; determining whether the secondary channel was free of control messages during the period; and providing, if the second channel was free of the control channel messages during the period, the computed value as $S_{reference} - I_{secondary} - D$, wherein D is a difference value; determining a number of the plurality of calculated values that are passed the threshold value; and setting the radio link quality state if the determined number exceeds a preset constant.

Some embodiments include a combination of one or more of any of the above. For example, in some embodiments, the difference value D represents an attenuation of a transmit power level of a signal transmitted on the second channel relative to a transmit power level of signal transmitted on the reference channel.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE SEVERAL VIEWS OF THE DRAWING

FIG. 5 shows a diagram of signals transmitted between a Node-B and user equipment in good signalling conditions, in accordance with the present invention.

FIG. 6 illustrates a signalling structure of a time domain duplex (TDD) system.

FIG. 7 illustrates a downlink signalling structure of a frequency domain duplex (FDD) system.

DETAILED DESCRIPTION OF THE INVENTION

In the following description, reference is made to the accompanying drawings which illustrate various embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
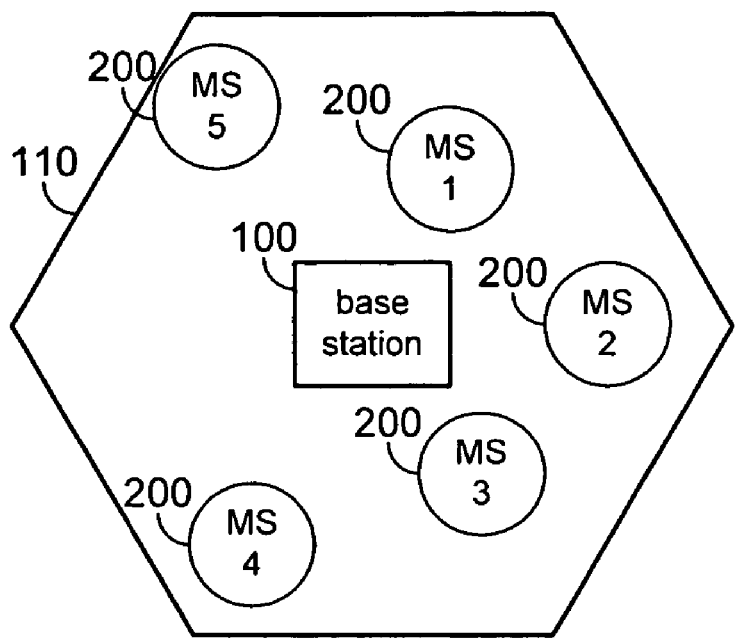
FIG. 1 illustrates a base station that forms a cell containing a number of mobile stations.

FIG. 1 illustrates a base station 100 that forms a cell 110 containing a number of mobile stations 200. In a CDMA network, each mobile station 200 that has a dedicated link to the base station 100 occupies a code resource. One solution to better use CDMA code resources is to eliminate the use of dedicated channels, which remain idle except for a duration of time that user data is available for transfer. For example, in an HSDPA network, no downlink DPCH channel is established when no user data is available for transfer.

Instead of a static allocation of a downlink channel to each mobile station expecting downlink data, a network may use a shared pool of downlink data channels. As user data arrives at the network and as downlink data channels from the shared pool are available, the network may dynamically allocate one or more downlink channels from the shared pool for the user data delivery. The networks transmits allocation messages on the common control channel to instruct a mobile station that user data will be transmitted on a particular one or more downlink data channels. Each mobile station may monitor this common control channel for downlink data channel allocation messages. When a UE receives an allocation message, the mobile station may process signals identified in the allocation message.

Unfortunately, a dedicated downlink channel, such as the downlink DPCH, is used within a mobile terminal to determine a quality of the downlink. This quality measure may be used to determine an in-synchronization or out-of-synchronization radio link quality state, which may be further used by the UE to determine whether the radio link is in a state of failure. The process of making this determination may be referred to as in-synchronization/out-of-synchronization detection or in/out sync detection. Without a dedicated channel, the in/out sync detection becomes more troublesome. The process of in/out sync detection is further compounded by the fact that a UE may have difficulty in distinguishing between a channel carrying a signal with poor quality and a channel with no signal. For example, an allocation message transmitted through a poor quality channel may appear to a receiver as noise.

Figure 2:
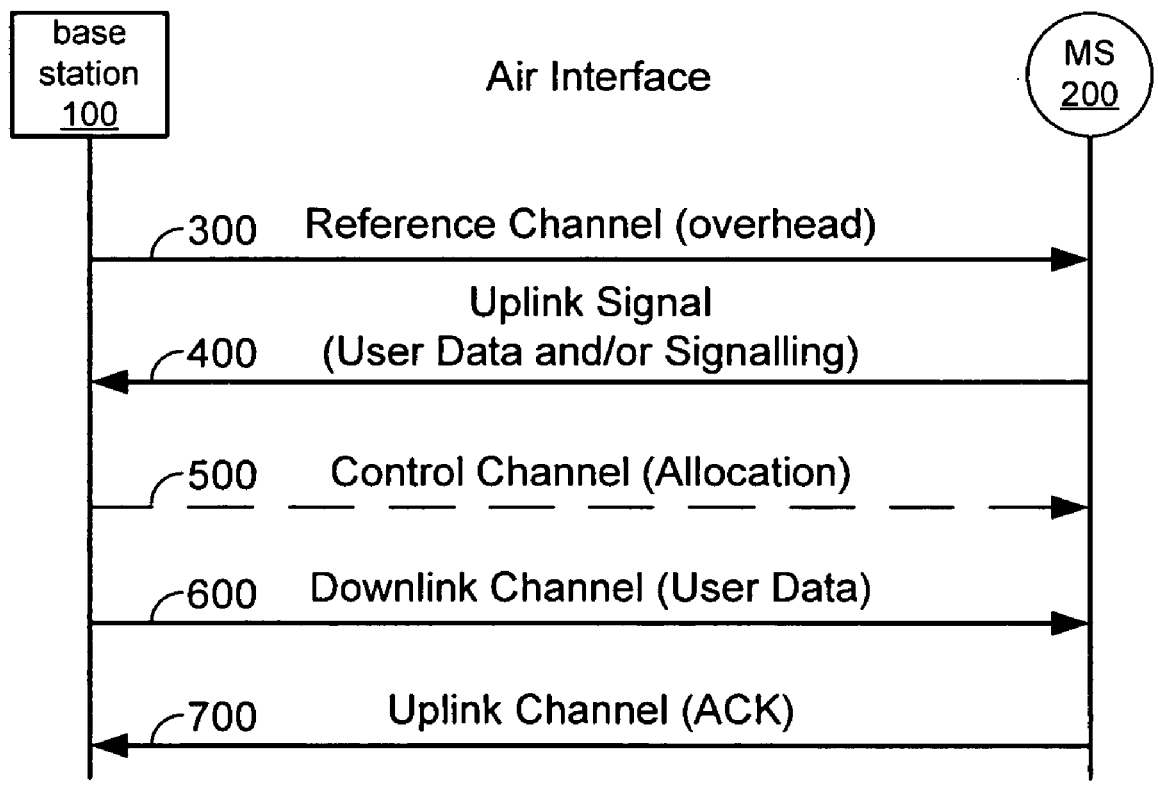
FIG. 2 shows a diagram of signals transmitted between a base station and a mobile station under good signalling conditions.

FIG. 2 shows a diagram of signals transmitted between a base station 100 and a mobile station 200 under good signalling conditions. When a channel from a base station 100 and mobile station 200 exhibits an acceptable number of errors, each downlink signal transmitted by the base station 100 to the mobile station 200 may be properly received by the mobile station 200. Similarly, when a channel from a mobile station 200 and a base station 100 exhibits an acceptable number of errors, each uplink signal transmitted by the mobile station 200 to the base station 100 may be properly received by the base station 100.

Typically in a wireless network, a base station 100 broadcasts to all mobile stations 200 system overhead information on a reference channel 300. Intermittently, a mobile station 200 may transmit user data 400 (e.g., a request to download the contents of a web page) and expect a response some time in the future. In response, the base station 100 will receive user data from the network for a mobile station 200 in a given cell. The base station 100 transmits an allocation message on a control channel 500 to the mobile station 200 and some short time later, the user data 600 is also transmitted. In turn, the mobile station 200 acknowledges receipt of the allocation and downlink user data by transmitting an uplink channel acknowledgement message 700.

Figure 3:
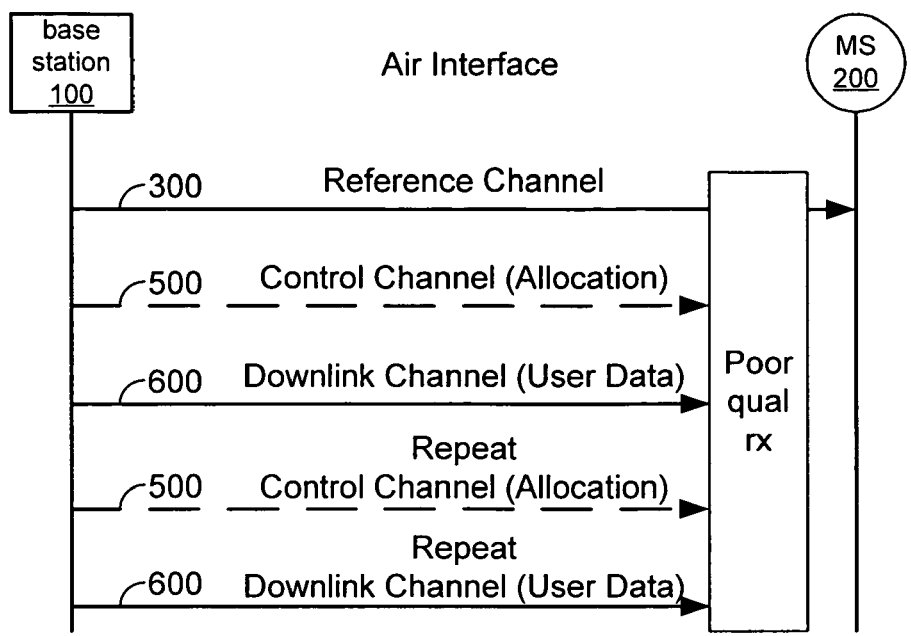
FIG. 3 shows a diagram of signals transmitted between a base station and a mobile station under poor signalling conditions.

FIG. 3 shows a diagram of signals transmitted between a base station and a mobile station under poor signalling conditions. When a network receives user data for a mobile station 200, the base station 100 transmits an allocation message on a control channel 500 and shortly afterwards, the user data 600.

If the channel quality is low or poor, a mobile station may not be able to receive the allocation message and hence will not send an acknowledgement on uplink. If a base station does not receive an acknowledgment, the base station may repeat sending the allocation 500 and user data 600 messages. Thus, if a network believes that a mobile station should be able to receive an allocation message, a base station 100 uses resources to transmit one or more allocation messages and instances of user data to the mobile terminal 200.

If a mobile terminal 200 is able to determine that channel may not have sufficient quality to communicate an allocation message, the mobile terminal 200 may indicate to the network via the base station 100 that it is out of synchronization with the network and that the downlink radio link has failed. Thus, the network and the base station 100 will refrain from transmitting allocation and user data messages to a mobile station that might not be able to receive the messages.

Figure 4:
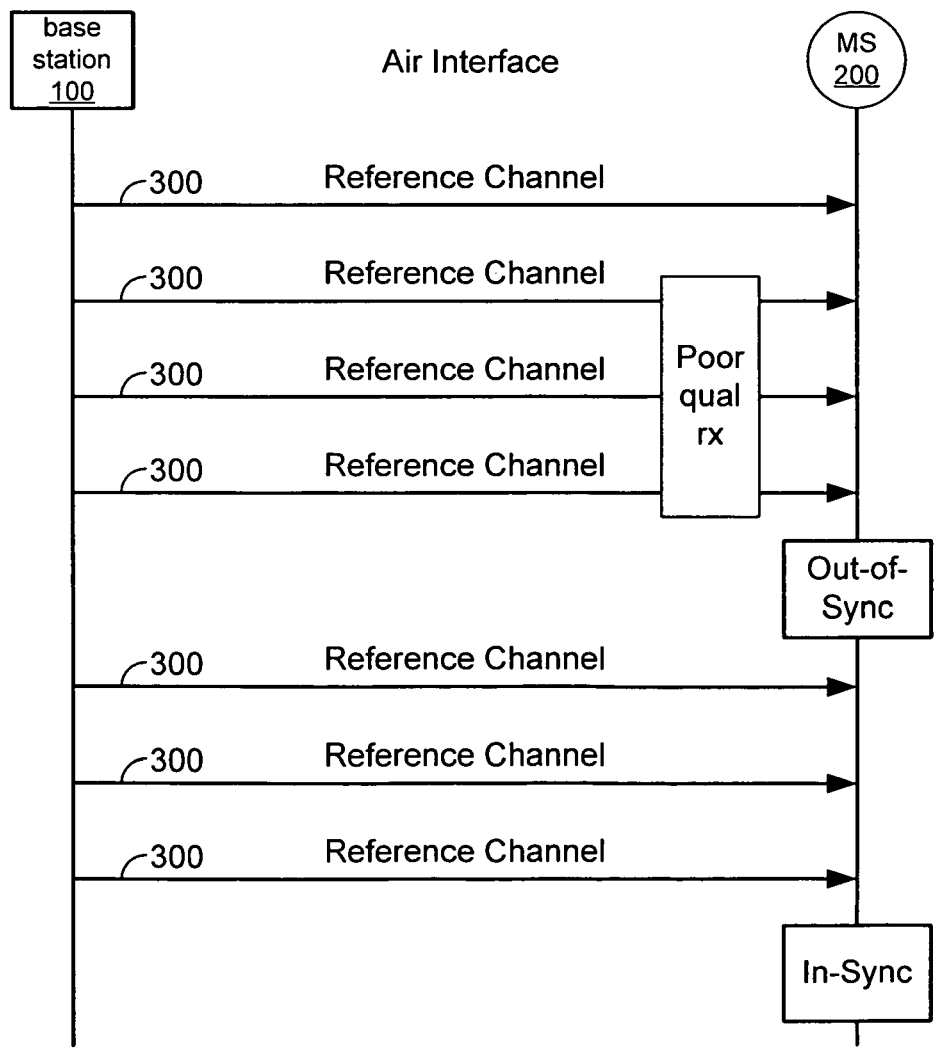
FIG. 4 shows a diagram of signals transmitted between a base station and a mobile station under poor signalling conditions in accordance with the present invention.

FIG. 4 shows a diagram of signals transmitted between a base station 100 and a mobile station 200 under poor signalling conditions in accordance with the present invention. A base station 100 broadcasts a reference channel signal 300. A mobile station 200 monitors the reference channel 300. When the mobile terminal 200 determines that the link quality is insufficient, the mobile terminal may declare an out-of-sync state and a corresponding radio link failure report.

Once a mobile terminal determines that it is in a state of radio link failure, several actions may be taken: (1) protocol layers above the physical layer in the mobile terminal are informed such that appropriate corrective procedures may be performed; (2) the uplink DPCH transmissions may be terminated; and (3) the mobile terminal temporary identifiers and other radio resources are released.

When protocol layers above the physical layer in the mobile terminal are informed that there is a quality problem on downlink, the mobile terminal may take appropriate action to try and re-establish the connection. The mobile terminal's physical layer (layer 1) reports an out-of-sync or in-sync primitive to upper layers of the mobile terminal. The upper layers then take the decision as to whether or not a Radio Link Failure message should be communicated to a radio network controller (RNC) via the base station (Node-B). If the uplink is capable of communicating a message, the mobile terminal 200 may indicate that it is no longer in synchronization with the base station 100 with a Radio Link Failure message. A radio resource release-and-restore function may be used re-establish a connection between the base station and the mobile terminal.

By terminating uplink DPCH transmissions, a mobile terminal is prevented from causing undue system interference with futile transmissions. For example, in a time division duplex (TDD) system, in order to release uplink code resources, a link may already be severed and so there may be no benefit in the mobile terminal continuing to make uplink transmissions, which may interfere with transmissions of other users.

When a higher layer releases the mobile terminal temporary identifier, the network may reuse the identifier for another mobile terminal. Additionally, once the radio link improves, a mobile terminal will not process data intended for another user.

When no higher-layer data is mapped to a downlink DCH, the downlink DPCH may be removed. Without a downlink DCH, the mobile terminal is no longer able to use a downlink DCH measurement to determine an in-sync/out-of-sync state. A mobile terminal should continue to estimate a downlink quality even without its downlink DPCH.

At some time in the future, the channel may improve. The mobile terminal 200 may monitor subsequent reference channels 300 and determine that physical layer synchronization has been regained. This may prevent declaration of radio link failure by higher layers in the mobile terminal 200.

FIG. 5 shows a diagram of signals transmitted between a node-B 100 and user equipment (UE) 200 in good signalling conditions, in accordance with the present invention. In a 3GPP network implementing a HSPDA system, a Node-B 100 broadcasts a beacon channel (BCH) 300, which may be used as a reference channel. A UE 200 monitors the BCH and, if expecting downlink data, also monitors a high speed-shared control channel (HS-SCCH) 500 for allocation messages. After a Node-B 100 transmits an allocation message on the HS-SCCH 500, it may then transmit user data on a high speed-downlink shared channel (HS-DSCH) 600.

For the downlink data transmission to be successful, both the allocation channel transmission (HS-SCCH) and the shared channel data transmission (HS-DSCH) signals must be received at the UE with sufficient quality. If either fails, then the data is not received. Thus, the downlink quality when operating HSDPA without an associated downlink DPCH has two points of failure: the HS-SCCH; and the HS-DSCH.

The quality on each channel is not necessarily correlated since different powers may be applied to each at the network side. Furthermore, interference on each may differ at the mobile receiver. An estimate of downlink quality made for the purposes of determining in/out-of-sync may take into account estimates either of the quality of HS-SCCH alone or of both the quality on HS-SCCH and on HS-DSCH.

Quality on a HS-DSCH may be relatively easier to determine than quality on a HS-SCCH. Specifically because a UE knows when it is to receive the HS-DSCH data if it received an HS-SCCH allocation but does now know when it is to receive the HS-SCCH allocation. Given that an allocation has been received on HS-SCCH, the UE is able to then configure its receiver appropriately to receive the forthcoming HS-DSCH user data.

The quality of the HS-DSCH reception may be estimated using various techniques. For example, the received signal strength (S), signal-to-noise ratio (SNR), or signal-to-noise-plus-interference ratio (SNIR) may be estimated and compared to a threshold. Alternatively, an integrity of the data carried on the HS-DSCH may be estimated by using known attributes of the forward error correction (FEC) scheme employed, or by checking the cyclical redundancy check (CRC) field appended to the data.

In contrast, quality on HS-SCCH is more difficult to determine. This is because the HS-SCCH is a common rather than a scheduled channel. A UE does not know a priori whether an HS-SCCH will be transmitted. The UE must continually check for existence of an HS-SCCH allocation message directed to it. Thus, in addition to checking for link quality, the UE must also make a decision as to whether or not an HS-SCCH was transmitted for that particular UE.

The UE has a set of HS-SCCH on which allocations to that UE may be signalled. Sometimes an allocation for the UE will exist on a given HS-SCCH. Other times, the HS-SCCH will be used to allocate data channels to other UEs. Still other times, no users are signalled allocations using a particular HS-SCCH.

A UE is able to identify HS-SCCH intended for it as a result of an HSDPA radio network temporary identifier (H-RNTI) value being signalled within the HS-SCCH message. The probability of incorrectly detecting a matching H-RNTI is improved by means of a cyclic redundancy check (CRC) field, which is also transmitted within the message. An efficiency-saving method of transmitting the H-RNTI value within the existing HS-SCCH CRC field is implemented within 3GPP, although logically, the H-RNTI and the CRC may still be considered as separately-transmitted information fields.

If a data integrity check performed on the HS-SCCH CRC passes, and the detected H-RNTI matches that of the UE, then the HS-SCCH message is considered successfully received by the UE. In this way, the UE can extract only those HS-SCCH intended for it, from the set of transmissions to all users on the common channels and a measure of the number of successful HS-SCCH receptions is known within the UE. However, the total number of attempted HS-SCCH transmissions is not directly known within the receiver and so the ratio of good HS-SCCH to total HS-SCCH (indicative of quality) is not known.

The dependency of determining an H-RNTI on the CRC pass criterion means that the UE cannot use only the CRC field to differentiate between a transmission intended for it (but received with poor quality) and a lack of an HS-SCCH transmission to that UE. Thus the downlink error performance of HS-SCCH is difficult to determine with a degree of accuracy.

To circumvent this issue for TDD HSPDA systems, a cyclic counter field (HCSN) may be incorporated into the HS-SCCH, which is incremented for each UE each time an HS-SCCH is transmitted to that UE. The UE can thus check the status of the HCSN upon each correctly-received HS-SCCH and may determine with reasonable accuracy how many HS-SCCH transmissions have been missed by the UE. Thus, the UE may estimate HS-SCCH quality by forming a ratio between received HS-SCCH messages and total transmitted HS-SCCH messages. This method of estimating downlink HS-SCCH quality needs: (1) a transmission on HS-SCCH to the UE before the quality may be estimated; and (2) the HS-SCCH transmission to pass CRC. This method fails to work when the UE is not being scheduled with downlink data and also fails to work the HS-SCCH quality becomes suddenly very poor and no messages are received. This method also fails to work when no CRC passes are experienced and the UE is unable to update its estimate of the number of missed HS-SCCH based upon the received HSCN value.

A second method of estimating HS-SCCH quality is to measure the received signal to noise-plus-interference ratio (SNIR) of HS-SCCH. However, again, this method suffers some drawbacks. The HS-SCCH is generally power controlled differently to each user, and so the UE can only check the SNIR of those HS-SCCH destined for it. The CRC must pass for the UE to be able to know whether the message was destined for it. As described above, the method fails to work when the UE does not detect an HS-SCCH message and may not work on a suddenly worsening of the HS-SCCH quality.

Therefore, a need exists for a mobile terminal to be able to estimate HS-SCCH quality in the absence of HS-SCCH transmissions to that UE and which furthermore is able to operate when the HS-SCCH quality suddenly worsens. Such a method may be useful for both time domain duplex (TDD) and frequency domain duplex (FDD) systems.

FIG. 6 illustrates a signalling structure of a time domain duplex (TDD) system. A series of downlink and uplink time slots (TS) are organized into a TDD frame (illustrated as Frame n, Frame n+1, Frame n+2). Each frame may be subdivided into a sequence of time slots (illustrated as TS 0, 1, 2, 3). A time slot may be used for either uplink or downlink traffic. The figure shows time slot TS 0 of each frame as carrying a beacon channel (BCH). The remaining time slots (TS 1, 2, 3) of Frame n as well as time slot 2 of Frame n+1 are idle. An allocation channel HS-SCCH is shown in time slot 1 of Frame n+1 and Frame n+2. User data channels HS-DSCH are shown in Frame n+1 time slot 3 as well as in Frame n+2 time slots 2 and 3.

FIG. 7 illustrates a downlink signalling structure of a frequency domain duplex (FDD) system. A base station is continuously transmitting a beacon channel (BCH). An HS-SCCH channel is inserted into the downlink single once an allocation message is need. The allocation message directs a UE to the subsequently transmitted HS-DSCH.

Some embodiments of the present invention include a method whereby the UE may estimate the potential quality of HS-SCCH transmissions, even in its absence. The method may be used to facilitate generation of an in/out-of-sync indication for the UE when operating HSDPA without an associated downlink DPCH. The method is furthermore operable in the absence of actual downlink data transmission using either the HS-SCCH or HS-DSCH channels.

In some embodiments, the method relies on the existence of another regular transmission on the downlink. This regular transmission is used as a reference in the absences of an allocation channel.

For the TDD mode of 3GPP, in the absence of a downlink DPCH, a beacon physical channel (BCH) may be used as the reference. A BCH is transmitted at a constant reference power ($P_{reference}$) known to the UE. Often, the BCH locations are occupied by the P-CCPCH channel (used to carry BCH information), but other channels may also fulfill the reference functionality.

For the FDD mode of 3GPP, the full downlink DPCH may be replaced with a fractionated downlink DPCH (F-DPCH). The F-DPCH is a physical channel onto which small amounts of pilot and power control command (TPC) information for multiple users may be multiplexed. The F-DPCH may therefore be used as the reference channel. Alternatively, the primary C-PICH may be used, which (like the beacon physical channels for TDD) is transmitted at a constant reference power known to the UE.

Figure 8:
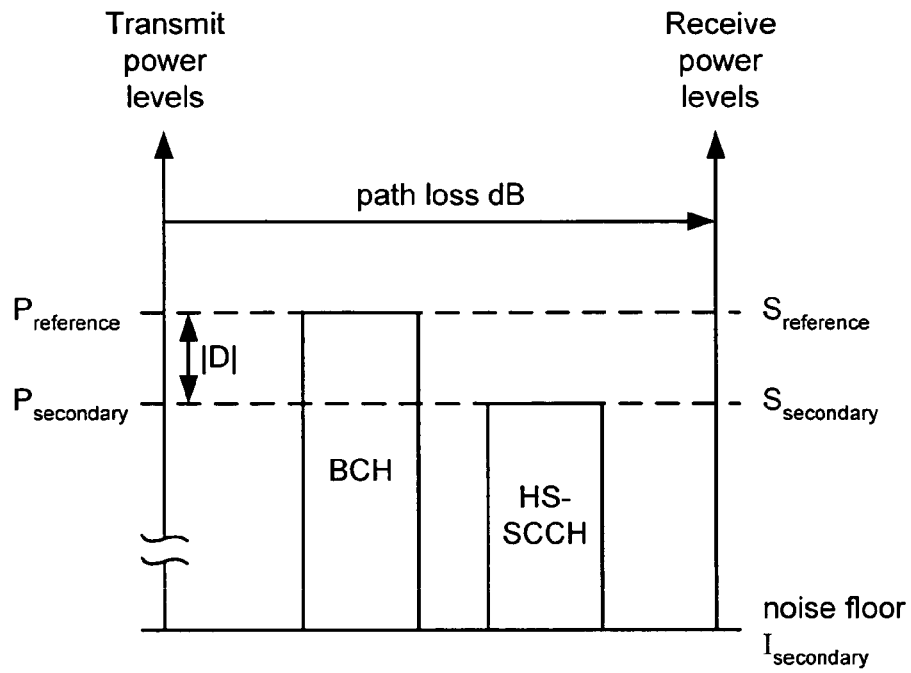
FIG. 8 shows relative power levels with respect to a transmitter and a receiver in accordance with the present invention.

FIG. 8 shows relative power levels with respect to a transmitter and a receiver in accordance with the present invention. A base station may transmit a first signal on a reference channel (shown as BCH) at a reference power level ($P_{reference}$). This reference signal passes through the channel between the base station and a mobile terminal. At the receiver of the mobile terminal, the reference signal is reduced by a channel path loss and is received at a power level ($S_{reference}$). Similarly, a secondary channel to be transmitted will be transmitted at power level ($P_{secondary}$). After being reduced by the channel path loss, the mobile terminal will receive a signal having power level ($S_{secondary}$). A difference in transmit signal power of reference signal and the secondary signal is represented as $D=P_{reference}-P_{secondary}$. A noise-plus-interference floor as seen by the receiver is indicated as $I_{secondary}$.

Figure 9:
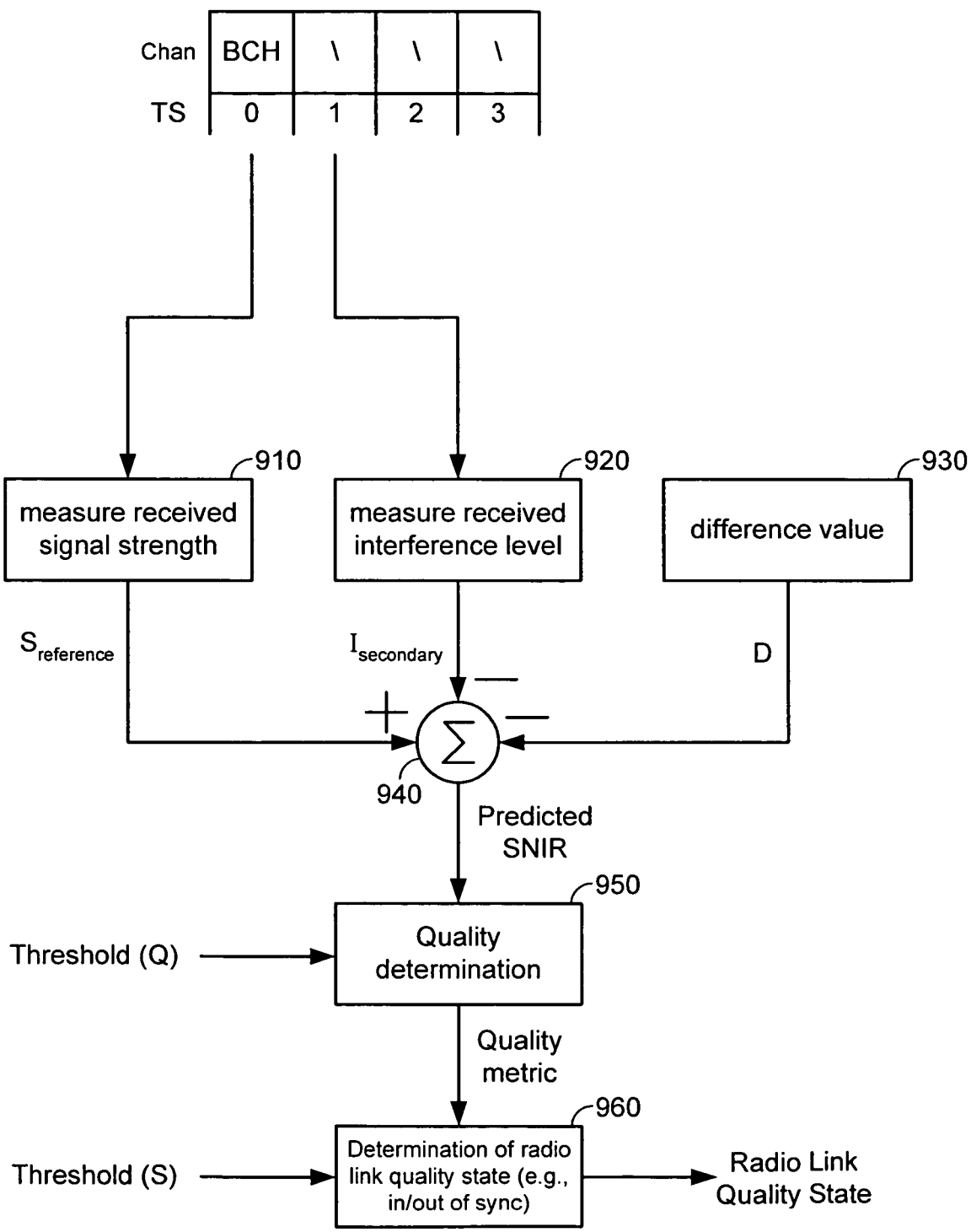
FIG. 9 shows a block diagram of a system determining a radio link quality state in accordance with the present invention.

For example, a BCH may be transmitted at $P_{reference}=0$ dBm. An intermittent channel used for allocation messages may be transmitted at $P_{secondary}=-10$ dBm. Therefore, the difference value $D=P_{reference}-P_{secondary}=+10$ dB. If the channel between the base station and mobile terminal has a path loss of 90 dB, then the respective received reference channel power and received secondary powers will be $S_{reference}=-90$ dBm and $S_{secondary}=-100$ dBm. A noise floor measurement may be $I_{secondary}=-105$ dBm FIG. 9 shows a block diagram of a system determining a radio link quality state in accordance with the present invention. In block 910, a mobile terminal measures a received signal strength of a first channel. The first channel is used as a reference channel to help estimate a path loss that is expected on a second channel. The first channel in a TDD system may be a physical beacon channel (BCH). The first channel in a CDMA FDD system may be a pilot channel.

The value provided by block 910 ($S_{reference}$) may represent a single measurement, or may be an averaged value. The averaged value may be formed by averaging a series of single measurements, or by otherwise low pass filtering the series of single measurements, such as through a windowing function, an FIR filter, or an IIR filter.

In block 920, the mobile terminal measures a received interference level on the second channel. The mobile terminal may comprise means for measuring the interference level in the presence or absence of a signal transmitted on the secondary channel. Thus, it may be possible for the mobile terminal to make an interference measurement when a signal intended for the mobile terminal is transmitted and detected, or when no signal is transmitted, or when signals are transmitted only for other users.

The value provided by block 920 ($I_{secondary}$) may represent a single measurement, or may be an averaged value. The averaged value may be formed by averaging a series of single measurements, or by otherwise low pass filtering the series of single measurements, such as through a windowing function, an FIR filter, or an IIR filter.

In block 930, the mobile terminal provides a difference value (D). The difference value may be signaled directly or indirect from the base station to the mobile. The difference value may be represented by a single value combination Of $P_{reference}$ and $P_{secondary}$, namely the difference, or by the terms separately.

Blocks 910, 920 and 930 may provide the respective signal values in dB or linear form. If in dB form, the combining will be in the form of addition and subtraction. If in linear form, the combining will be in the form of multiplication and division. For example, if D is represented by a single term in dB, it may be formed by the subtraction $D=P_{reference}-P_{secondary}$. If D is a single term in linear form, it may be formed by the division $D=P_{reference}/P_{secondary}$.

A combiner 940 provides a predicted SNIR of the second channel. In dB, the combiner forms the predicted $SNIR=S_{reference}-D-I_{secondary}$. If in linear form, the combiner forms the predicted $SNIR=(S_{reference}/D)/I_{secondary}$. Using the example values given above, the predicted SNIR=−90 dBm−+10 dbm−−105 dBm=+5 dB.

The value provided by combiner 940 (predicted SNIR) may represent a single measurement, or may be an averaged value. The averaged value may be formed by averaging a series of single measurements, or by otherwise low pass filtering the series of single measurements, such as through a windowing function, an FIR filter, or an IIR filter.

In block 950, the predicted SNIR is compared to a threshold value (Q) to determine a quality metric. For example, if the predicted SNIR is less than the threshold value (Q), the quality metric may be set to an out-of-sync state. For example, the threshold value (Q) may be set to −12 dB. If a predicted SNIR is estimated at less than −12 dB, the quality metric may be set to an out-of-sync state.

In block 960, a series of quality metric may be analyzed to determine if a radio link failure should be declared. For example, if a number of quality metrics, which are determined to represent an out-of-sync state, or a number of quality metrics that are determined to represent an out-of-sync state within a defined time period, exceeds a threshold (S), the mobile terminal may declare that the downlink of the second channel is insufficient for communicating messages to the mobile terminal.

Figure 10:
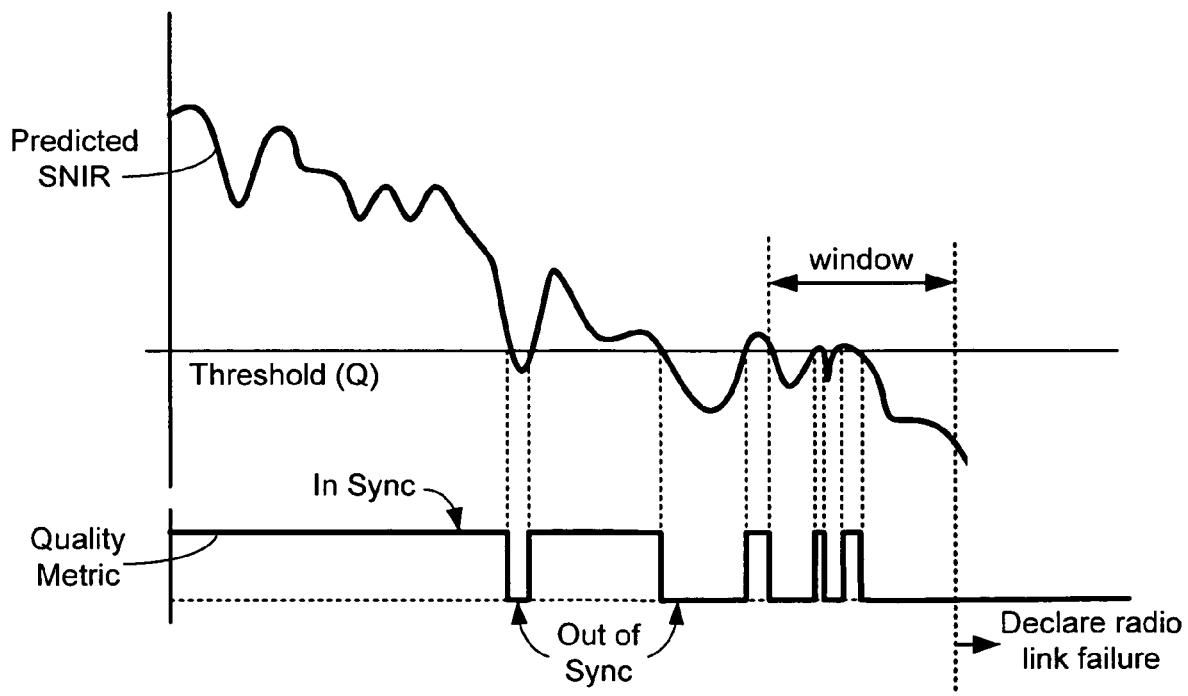
FIG. 10 graphs a predicted SNIR with respect to a resulting in-sync/out-of-sync and radio-link-failure determination, in accordance with the present invention.

FIG. 10 graphs a predicted SNIR with respect to a resulting in-sync/out-of-sync and radio-link-failure determination, in accordance with the present invention. A combiner 940 (see FIG. 9) may produce a discrete set of predicted SNIR values. A quality metric may be determined by a threshold comparison (see block 950, FIG. 9) and may produce a binary in-sync or out-of-sync quality metric value. A sliding window may be used to sum a number of times that an out-of-sync value was determined within the sliding window. If this number exceeds a second threshold (S), a radio-link-failure state may be declared (see block 960, FIG. 9).

If an out-of-sync state or a radio-link-failure is determined, the mobile radio may initiate a release-and-restore function in an attempt to reestablish the link.

While the invention has been described in terms of particular embodiments and illustrative figures, those of ordinary skill in the art will recognize that the invention is not limited to the embodiments or figures described. For example, the SNIR may be replaced with an SNR value or other signal quality indicator. The difference value D may be broadcast or signaled. Alternatively, the first and second transmit power levels may be communicated to the mobile terminal.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of determining a radio link quality state in a wireless communication system, the method comprising:
measuring at a receiving station a received signal strength of a first channel;
measuring at the receiving station a received interference level of a second channel, wherein the second channel comprises a shared control channel operable to allocate shared channel resources to the receiving station,
predicting at least one quality metric for a hypothetical transmission of the second channel using a plurality of parameters, including:
the received signal strength of the first channel;
the received interference level of the second channel; and
an adjustment parameter, wherein the adjustment parameter is based upon the difference between a first transmit power level of a first signal transmitted on the first channel and a potential transmit power level of a second signal transmitted on the second channel; and
identifying the radio link quality state based upon the at least one quality metric and further based upon an acceptable radio link quality level.

2. The method of claim 1, wherein the radio link quality state comprises a failed state in response to the at least one quality metric being below the acceptable radio link quality level.

3. The method of claim 1, wherein the at least one quality metric includes a signal-to-noise-plus-interference ratio (SNIR) of the second channel, a signal-to-noise ratio (SNR) of the second channel, or a combination thereof.

4. The method of claim 1, wherein predicting at least one quality metric of the second channel includes combining:
the received signal strength of the first channel;
a negative of the received interference level of the second channel; and
the difference between the first transmit power level of the first signal transmitted on the first channel and the second transmit power level of the second signal transmitted on the second channel.

5. The method of claim 1, wherein at least one of the plurality of parameters is wirelessly signaled from a network to a mobile terminal.

6. The method of claim 1, wherein at least one of the plurality of parameters is wirelessly broadcast from a network to a plurality of mobile terminals.

7. The method of claim 1, wherein at least one of the plurality of parameters is a constant value.

8. The method of claim 1, wherein the identifying the radio link quality state includes computing a statistic from multiple determinations of the predicted quality metric.

9. The method of claim 8, wherein the identifying the radio link quality state further includes:
comparing the statistic to a threshold value; and
setting the radio link quality state based on the comparison.

10. The method of claim 1, wherein the first channel is a channel having a constant transmit power level over a period.

11. The method of claim 1, wherein the first channel is transmitted within a first time slot period and the second channel is transmitted within a second time slot period different than the first time slot period.

12. The method of claim 1, wherein the first channel is transmitted with a first code and the second channel is transmitted with a second code different than the first code.

13. The method of claim 1, wherein the first channel includes a beacon channel.

14. The method of claim 1, wherein the second channel communicates channel allocation messages.

15. The method of claim 1, wherein at least one of the plurality of parameters is formed from a series of values.

16. The method of claim 15, wherein the at least one of the plurality of parameters is formed from by an averaging process of the series of values.

17. A method of predicting a radio link quality state on a secondary channel in a wireless communication system between a network and a mobile terminal, wherein the secondary channel is used intermittently as a control channel, the method comprising:
comparing a threshold value to a plurality of calculated values, wherein each of the plurality of calculated values is sequentially formed by:
measuring at the mobile terminal a reference level of signal strength received by the mobile terminal on a reference channel;
measuring at the mobile terminal, within a period, a level of noise-plus-interference received by the mobile terminal on the secondary channel; and
providing the computed value as the difference of the reference level of signal strength, the level of noise-plus-interference received, and an attenuation of a transmit power level, wherein the attenuation of a transmit power level represents an attenuation of a transmit power level of a signal transmitted on the secondary channel relative to a transmit power level of signal transmitted on the reference channel;
determining a number of the plurality of calculated values that are past the threshold value; and
setting the radio link quality state if the determined number exceeds a preset constant.

18. The method of claim 17, wherein the each of the plurality of calculated values is further formed by determining whether the secondary channel was free of control messages during the period, and if the secondary channel was free of the control channel messages during the period providing the computed value.

19. The method of claim 17, wherein providing the computed value is represented by $S_{reference} - I_{secondary} - D$, wherein
$S_{reference}$ is the noise-plus-interference received by the mobile terminal on the secondary channel,
$I_{secondary}$ is the noise-plus-interference received by the mobile terminal on the secondary channel, and
D is the attenuation of the transmit power level.

* * * * *